April 2, 1957  I. GISSER ET AL  2,787,492
ADJUSTABLE PIPE REMOVER
Filed May 19, 1955
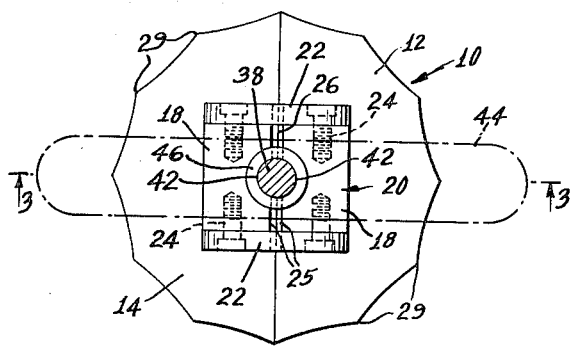
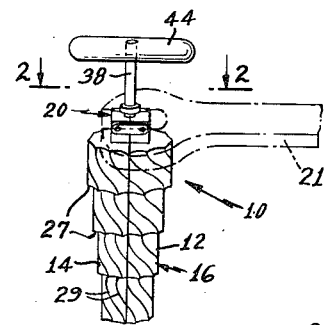
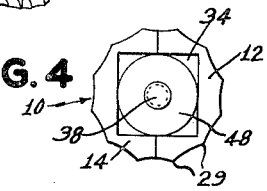
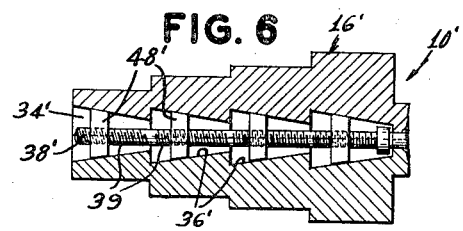
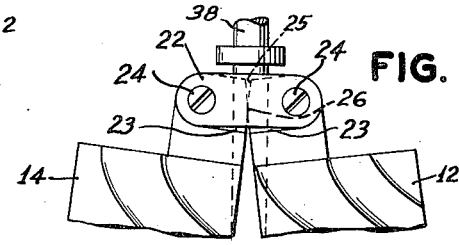
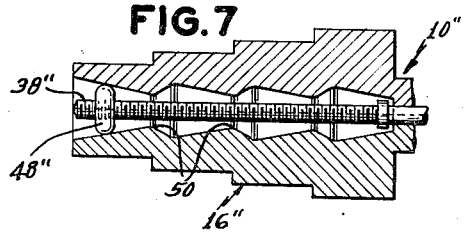
INVENTORS
Isidore Gisser
BY Myron Cohen
ATTORNEYS United States Patent Office 2,787,492
Patented Apr. 2, 1957

2,787,492

ADJUSTABLE PIPE REMOVER

Isidore Gisser, Bronx, and Myron Cohen, New York, N. Y., assignors, by mesne assignments, of one-half to Isidore Gisser, and one-half to George Savitt, Bronx, N. Y.

Application May 19, 1955, Serial No. 509,447

14 Claims. (Cl. 294—96)

This invention relates to pipe removers and particularly to adjustable pipe removers.

The present invention is directed to a device for removing pipes which are not accessible to wrenches or pliers or other external means for removing pipes. Such a condition often arises when a rusted or corroded pipe is being removed from a plumbing installation and due to the weakened condition of the pipe, a portion of the pipe shears off leaving a short pipe section connected to another pipe. The short piece may not extend outwardly of the other pipe a sufficient distance to permit a wrench to be connected thereto and, accordingly, normal means for removing this pipe section are unavailable.

In the past when such a condition arose a heavy tapered member was hammered into the broken off section of the pipe to a sufficient degree to cause that tapered member to grip the inside of the pipe. The tapered member was so constructed that a portion thereof would extend outside of said pipe and the outwardly extending portion was provided with a suitable configuration to be gripped by a wrench or pliers for turning and thereby turning the broken off section of the pipe for removing it. With the arrangement employed heretofore, it has been necessary for plumbers and other persons working with pipes to have available a relatively large number of the tapered pipe removers heretofore mentioned and, accordingly, since each of these members is relatively heavy and expensive, undue physical and economic strain was put on the workmen. Furthermore, in order to insure proper gripping of the pipe by the pipe remover, it was necessary to hammer the tapered pipe remover into the pipe with a sledge or heavy hammer which often damaged the good section of the pipe to which the broken pipe section was connected.

It is one object of the present invention to provide a pipe remover which is adapted to remove pipes of different internal diameters.

Another object of the present invention is to provide a pipe remover which is readily insertable into the pipe to be removed and thereafter may be expanded for gripping the internal surface of the pipe to remove said pipe.

It is another object of the present invention to provide a pipe remover of relatively light weight for removing pipes of different sizes.

It is a general object of the present invention to provide a generally improved pipe remover which is adapted to remove pipes of different internal diameters and which has a new and improved means for expanding said pipe remover in order for the pipe remover to grip the internal surface of the pipe to be removed.

Other objects of the present invention will become clear hereinafter as the characteristic features of construction and mode of operation of our adjustable pipe remover are described in detail.

Referring now to the drawings:

Fig. 1 is a perspective view of an adjustable pipe remover embodying this invention;

Fig. 2 is a sectional view taken along the line 2—2 of Fig. 1;

Fig. 3 is a sectional view taken along the line 3—3 of Fig. 2;

Fig. 4 is a bottom view looking in the direction of arrow 4 in Fig. 3;

Fig. 5 is a fragmentary side elevation view showing the pipe remover in expanded condition;

Fig. 6 is a view similar to Fig. 3 illustrating a modification of the present invention; and Fig. 7 is a view similar to Fig. 3 illustrating another form of this invention.

Referring now to the drawings in detail, a pipe remover 10 is made up of a pair of complementary members 12 and 14 which together form a peripherally continuous body 16. Each complementary member is provided with a rectangular upper portion 18 which together form a square head 20 which is adapted to be gripped by a suitable wrench or other tool 21 for rotating the pipe remover 10. Complementary members 12 and 14 are pivotally connected to each other at head 20 by means of a pair of straps 22 which extend across head 20 in slots 23 and the straps are pivotally connected to each of the upper rectangular portions 18 of complementary members 12 and 14 by means of screws 24. Each portion 18 of head 20 is provided with a slight tapered shoulder 25 which confronts the opposing tapered shoulder of the other portion whereby to permit pivotal movement of members 12 and 14 towards and away from each other about point 26 as is best illustrated in Fig. 5. In this manner the pipe remover can be expanded and contracted radially in a manner to be described in detail hereinafter.

As best shown in Figs. 1 and 3 body portion 16 of pipe remover 10 is made up of a plurality of stepped portions 27, each step being of increased diameter as one views the pipe remover from bottom to top. Each of the steps of the pipe remover in its contracted condition is slightly smaller than the internal diameter of a given pipe so that when it is desired to remove a pipe of a stated size, the pipe remover can be inserted into the pipe sufficiently far for the step just smaller than the internal diameter of the pipe to be in close confronting relation with said pipe. Once the pipe remover is so positioned, it may be expanded by means which will be described in detail hereinafter so as to cause the close confronting step of the pipe remover to tightly engage the inner surface of the pipe. Thereafter the head 20 may be gripped by a suitable tool such as wrench 21 and the wrench may be turned to thereby turn the pipe remover 10 which because it is tightly gripping the inner surface of the pipe will turn said pipe and thereby remove it. It is to be noted in order to facilitate and enhance the gripping action of the pipe remover, the exterior surface of the pipe remover is provided with spiral ridges 29 which bite into the inner wall of the pipe to be removed and thereby insure a positive locking between the pipe remover in its expanded condition and the pipe.

To provide for the expansion and contraction of the peripherally continuous body 16, body 16 is provided internally thereof with a channel 34. The channel 34 is made up of a plurality of tapered portions 36. In accordance with the presently preferred embodiment of this invention, the taper of each tapered portion is less than the taper of the tapered portion immediately beneath for reasons which will become clear presently. Disposed within said channel 34 is a threaded shaft 38 which is journalled in a bearing 40 in head 20 formed by two complementary semi-circular grooves 42 in head portions 18. A handle 44 is connected to threaded shaft 38 as by a pressed fit in order to facilitate the rotation of the shaft. To prevent substantial longitudinal displacement of shaft 38 a pair of collars 46 are fixedly secured to the shaft adjacent the upper and lower surfaces of head 20 as by pressed fits.

Threadedly mounted on shaft 38 within channel 34 are a plurality of non-circular nuts 48 which preferably have the same peripheral configuration as channel 34, that is square in the particular form illustrated herein. Preferably, one nut 48 is disposed in each tapered portion of channel 34, and each nut is provided with a slight tapered peripheral wall, the taper being preferably the same as the taper of the associated tapered channel portion so that each nut engages the wall of the channel 34 over the entire peripheral surface thereof. In view of the fact that both the channel 34 and the nuts 48 are non-circular, it is believed clear that when shaft 38 is rotated by turning handle 34, nuts 48 are prevented from turning due to the engagement thereof with the wall of channel 34 and, accordingly, the nuts 48 move longitudinally of shaft 38 and channel 34 to thereby cause the complementary members 12 and 14 to pivot outwardly or inwardly from one another in a radial direction. It is this movement of the nuts which causes the pipe remover to expand when disposed in a pipe to thereby cause said pipe remover to grip the inner surface of the pipe for removal.

As will be noted, channel 34 is relatively large thereby rendering the weight of the entire instrument considerably less than would be a solid pipe remover of similar size. This substantial reduction in the weight of the pipe remover facilitates handling and saves in the cost of materials employed in manufacturing the pipe remover. With this relatively large channel 34 extending through the center of the pipe remover, when the pipe remover is employed to grip a pipe, considerable strain is put on the external surface of the pipe which strain is directed inwardly. However, by providing each tapered portion 36 with a different taper, each of the nuts 48 remains in contact with the wall of channel 34 throughout the entire longitudinal movement of each nut. Accordingly, regardless of the positions of nuts 48 within their associated channel portions, each nut will serve to reenforce its associated step thereby enabling the wall thickness of the step to be relatively small and the pipe remover to be relatively light-weight.

Referring now to Fig. 6, a modification of this invention is illustrated. In accordance with this form, the pipe remover 10' is of the same construction as pipe remover 10 of Figs. 1 to 5 except that the tapered portions 36' of channel 34' are all of the same taper. In order to maintain nuts 48' always in contact with the wall of channel 34' threaded shaft 38' is provided with threaded sections 39 of different pitches, the maximum pitch being associated with the lowermost section and each other section having threads of increasingly smaller pitches. With such an arrangement, the lowermost nut will travel further than the next to lowermost nut, etc., for a given amount of turning of shaft 38'. The parts are so proportioned that each nut 48' always stays in contact with the wall of channel 34' whereby it can reenforce its associated step regardless of the positioning of the nut in its associated channel portion.

Referring now to Fig. 7, another form of the present invention is illustrated. The structure is substantially identical with the structure shown in Figs. 1 to 5 and differs therefrom in that there is only one nut 48" disposed on shaft 38" and this nut is movable the full length of threaded portion of shaft 38". Although it will be obvious that movement in any one of the tapered portions will serve to spread the pipe remover a sufficient distance apart to grip the pipe, the channel extends the full length of the body 16" to reduce the weight of the pipe remover and the nut is movable along the entire channel in order to be associated with the step which is intended to be employed for gripping the inner surface of a pipe so as to reinforce that step in a manner similar to the manner in which each of the nuts 48 and 48' reinforce their associated steps. It is to be noted that in order to permit movement of the nut 48" to the left as viewed in Fig. 7 from one tapered portion to the other, the nut is provided with a rounded surface so as to reduce the possibility of an interengagement with the shoulders 50 in the channel, and these shoulders are tapered in order to minimize this possible effect.

Although we have herein shown and described several forms of this invention, it will be understood that various changes and modifications may be made therein within the scope of the appended claims without departing from the spirit and scope of this invention.

Having thus described our invention, what we claim and desire to secure by Letters Patent is:

1. A pipe remover comprising a pair of complementary members forming a main body portion having a non-circular portion at one end thereof adapted to be gripped for turning said pipe remover, a pair of straps pivotally connected at each end thereof to said one end of each of said complementary members, said straps being connected to said complementary members on opposed surfaces of said non-circular portion whereby said complementary members are pivotally movable toward and away from each other in a radial direction, and means for moving said members toward and away from each other.

2. An expandible pipe remover for gripping the internal surface of a pipe, comprising a plurality of confronting complementary members forming a peripherally continuous body, said peripherally continuous body having a plurality of longitudinally extending steps of different lateral dimensions, each of said steps being adapted to engage a pipe of a different inner lateral dimension and being of smaller lateral dimension than said pipe when said pipe remover is inserted therein, means operatively connecting said complementary members to each other for movement toward and away from one another whereby to laterally contract and expand said peripherally continuous body for disengaging said pipe remover from and engaging said pipe remover with a pipe, one of said members having a longitudinally extending groove provided with a plurality of tapered portions whereby said complementary members in confronting relationship form a longitudinally extending channel within said peripherally continuous member, said channel having a plurality of tapered portions, one of said tapered portions for each of said steps, a spreader member movably disposed in said channel and adapted to engage the wall thereof, each of said tapered channel portions having one location of a given lateral dimension and another location of a smaller lateral dimension, the parts being proportioned so that when said member is disposed in said channel at one of said one locations, said complementary members are close to one another and said peripherally continuous body is of minimum lateral dimension whereby to permit the insertion of one of said steps into said pipe or tubular member and when said spreader member is at one of said other locations said complementary members are separated from one another and said peripherally continuous body has a lateral dimension greater than said minimum to thereby cause said one step to tightly engage the internal surface of said pipe, and means for moving said spreader member to and from said locations whereby to increase and decrease the lateral dimension of said peripherally continuous body for engaging and disengaging said pipe remover from the internal surface of the pipe.

3. An expandible pipe remover for gripping the internal surface of a pipe, comprising a pair of confronting complementary members forming a peripherally continuous body, said peripherally continuous body having a plurality of longitudinally extending cylindrical steps, said steps being of progressively larger diameter with the step of smallest diameter being adjacent one end of said body, each of said steps being adapted to engage a pipe of corresponding diameter and being smaller than said pipe when said pipe remover is in its unexpanded condition, means operatively connecting said complementry members to each other for movement toward and away from one another whereby to laterally contract and expand said peripherally continuous body for engaging and disengaging said pipe remover from a pipe, each of said complementary members having a longitudinally extending non-semicircular groove provided with a plurality of tapered portions whereby said complementary members in confronting relation form therebetween a longitudinally extending non-circular channel having a plurality of tapered portions, one tapered portion for each of said steps, a rotatable longitudinally extending threaded shaft disposed within said channel with a portion thereof extending outside of said channel, a handle on said last mentioned shaft portion adapted to be turned for turning said shaft, a plurality of non-circular spreader members threadedly mounted on said threaded shaft, one spreader member disposed in each tapered portion of said channel and engaging the wall thereof, whereby when said threaded shaft is turned said spreader members move longitudinally to expand and contract said peripherally continuous body, each step in the expanded condition of said body being of sufficient diameter to tightly engage the inner surface of a pipe of corresponding diameter, said spreader members reinforcing the walls of their associated steps when said pipe remover is in the expanded condition within a pipe.

4. An expandible pipe remover for gripping the internal surface of a pipe, comprising a pair of confronting complementary members forming a peripherally continuous body, said peripherally continuous body having a plurality of longitudinally extending cylindrical steps, said steps being of progressively larger diameter with the step of smallest diameter being adjacent one end of said body, each of said steps being adapted to engage a pipe of corresponding diameter and being smaller than said pipe when said pipe remover is inserted therein, means operatively connecting said complementary members to each other for movement toward and away from one another whereby to laterally contract and expand said peripherally continuous body for disengaging said pipe remover from and engaging said pipe remover with a pipe, each of said complementary members having a longitudinally extending non-semicircular groove provided with a plurality of tapered portions whereby said complementary members in confronting relation form therebetween a longitudinally extending non-circular channel having a plurality of tapered portions, one tapered portion for each of said steps, a rotatable longitudinally extending threaded shaft disposed within said channel with a portion thereof extending outside of said channel, a handle on said last mentioned shaft portion and adapted to be turned for turning said shaft, a non-circular spreader member threadedly mounted on said shaft and engaging the wall of said channel, whereby when said threaded shaft is turned said spreader member moves longitudinally thereof, said spreader member being movable substantially the full extent of said channel whereby said peripherally continuous body goes through a series of expansions and contractions when said spreader is moved from one end of said tapered channel portions to another, whereby said spreader member is positionable in the tapered portion of said channel associated with a given step to reinforce the wall thereof when said step is in engagement with the inner wall of a pipe.

5. An expandible pipe remover for gripping the internal surface of a pipe, comprising a pair of confronting complementary members forming a peripherally continuous body having a plurality of longitudinally extending steps of different lateral extents, means pivotally connecting said complementary members to each other adjacent the step of maximum lateral dimension whereby said complementary members are movable away from and toward each other in a radial direction for expanding and contracting said peripherally continuous body for engaging and disengaging said pipe remover from a pipe, one of said members having a longitudinally extending groove provided with a plurality of tapered portions whereby said complementary members in confronting relationship form a longitudinally extending channel within said peripherally continuous member, said channel having a plurality of tapered portions, one of said tapered portions for each of said steps, a spreader member movably disposed in said channel and adapted to engage the wall thereof, each of said tapered channel portions having a first location of a given lateral dimension and a second location of a smaller lateral dimension, the parts being proportioned so that when said member is disposed in said channel at one of said first locations, said complementary members are close to one another and said peripherally continuous body is of minimum lateral dimension whereby to permit the insertion of one of said steps into said pipe or tubular member and when said spreader member is at one of said second locations, said complementary members are separated from one another and said peripherally continuous body has a lateral dimension greater than said minimum to thereby cause said one step to tightly engage the internal surface of said pipe, and means for moving said spreader member to and from said locations whereby to increase and decrease the lateral dimension of said peripherally continuous body for engaging and disengaging said pipe remover from the internal surface of the pipe.

6. An expandible pipe remover for gripping the internal surface of a pipe, comprising a pair of confronting complementary members forming a peripherally continuous body, said peripherally continuous body having a plurality of longitudinally extending cylindrical steps, said steps being of progressively larger diameter with the step of smallest diameter being adjacent one end of said body, each of said steps being adapted to engage a pipe of corresponding diameter and being smaller than said pipe when said pipe remover is inserted therein, each of said complementary members having a longitudinally extending portion adjacent the step of maximum diameter whereby said peripherally continuous body is provided with a longitudinally extending portion, said last mentioned body portion being non-circular and being adapted to be gripped for turning said pipe remover, means pivotally connecting said complementary members to each other at said longitudinally extending non-circular portion for movement radially of each other for expanding and contracting said peripherally continuous body whereby to engage and disengage said pipe remover from a pipe, each of said complementary members having a longitudinally extending groove provided with a plurality of tapered portions whereby said complementary members in confronting relation form therebetween a longitudinally extending channel having a plurality of tapered portions, said body channel being non-circular, one tapered portion for each of said steps, a rotatable longitudinally extending threaded shaft disposed within said channel with a portion thereof extending outside of said channel, a handle on said last mentioned shaft portion and adapted to be turned for turning said shaft, a plurality of non-circular spreader members threadedly mounted on said threaded shaft, one spreader member disposed in each tapered portion of said channel and engaging the wall thereof, whereby when said threaded shaft is turned said spreader members move longitudinally to expand and contract said peripherally continuous body, each step in the expanded condition of said body being of sufficient diameter to tightly engage the inner surface of a pipe of corresponding diameter, said spreader members reinforcing the walls of their associated steps when said pipe remover is in the expanded condition within a pipe.

7. An expandible pipe remover for gripping the internal surface of a pipe, comprising a pair of confronting complementary members forming a peripherally continuous body, said peripherally continuous body having a plurality of longitudinally extending cylindrical steps, said steps being of progressively larger diameter with the step of smallest diameter being adjacent one end of said body, each of said steps being adapted to engage a pipe of corresponding diameter and being smaller than said pipe when said pipe remover is in its non-expanded condition, each of said complementary members having a longitudinally extending portion adjacent the step of maximum diameter whereby said peripherally continuous body is provided with a longitudinally extending portion, said last mentioned body portion being non-circular and being adapted to be gripped for turning said pipe remover, means pivotally connecting said complementary members to each other at said longitudinally extending non-circular portion for movement radially of each other for expanding and contracting said peripherally continuous body whereby to engage and disengage said pipe remover from a pipe, each of said complementary members having a longitudinally extending groove provided with a plurality of tapered portions whereby said complementary members in confronting relation form therebetween a longitudinally extending channel having a plurality of tapered portions, said body channel being non-circular, one tapered portion for each of said steps, a rotatable longitudinally extending threaded shaft disposed within said channel with a portion thereof extending outside of said channel, a handle on said last mentioned shaft portion and adapted to be turned for turning said shaft, a non-circular spreader member threadedly mounted on said shaft and engaging the wall of said channel, whereby when said threaded shaft is turned said spreader member moves longitudinally thereof, said spreader member being movable substantially the full extent of said channel whereby said peripherally continuous body goes through a series of expansions and contractions when said spreader is moved from one end of said channel to the other, whereby said spreader member is positionable in the tapered portion of said channel associated with a given step to reinforce the wall thereof when said step is in engagement with the inner wall of a pipe.

8. An expandible pipe remover for gripping the internal surface of a pipe, comprising a pair of confronting complementary members forming a peripherally continuous body, said peripherally continuous body having a plurality of longitudinally extending cylindrical steps, said steps being of progressively larger diameter with the step of smallest diameter being adjacent one end of said body, each of said steps being adapted to engage a pipe of corresponding diameter and being smaller than said pipe when said pipe remover is inserted therein, each of said complementary members having a longitudinally extending portion adjacent the step of maximum diameter whereby said peripherally continuous body is provided with a longitudinally extending portion, said last mentioned body portion being non-circular and being adapted to be gripped for turning said pipe remover, means pivotally connecting said complementary members to each other at said longitudinally extending non-circular portion for movement radially of each other for expanding and contracting said peripherally continuous body whereby to engage and disengage said pipe remover from a pipe, each of said complementary members having a longitudinally extending groove provided with a plurality of tapered portions whereby said complementary members in confronting relation form therebetween a longitudinally extending channel having a plurality of tapered portions, said body channel being non-circular, one tapered portion for each of said steps, the tapered channel portion most remote from said pivotal connection having the largest taper and each other tapered portion having successively smaller tapers, a rotatable longitudinally extending threaded shaft disposed within said channel with a portion thereof extending outside of said channel, a handle on said last mentioned shaft portion and adapted to be turned for turning said shaft, a plurality of non-circular spreader members threadedly mounted on said threaded shaft, one spreader member disposed in each tapered portion of said channel and engaging the wall thereof, whereby when said threaded shaft is turned said spreader members move longitudinally to expand and contract said peripherally continuous body, each step in the expanded condition of said body being of sufficient diameter to tightly engage the inner surface of a pipe of corresponding diameter, the parts being so proportioned that each spreader member is in contact with the channel wall throughout the extent of the movement of said spreader member whereby to reinforce the wall of their associated steps when said pipe remover is in engagement with a pipe.

9. An expandible pipe remover for gripping the internal surface of a pipe, comprising a pair of confronting complementary members forming a peripherally continuous body, said peripherally continuous body having a plurality of longitudinally extending cylindrical steps, said steps being of progressively larger diameter with the step of smallest diameter being adjacent one end of said body, each of said steps being adapted to engage a pipe of corresponding diameter and being smaller than said pipe when said pipe remover is inserted therein, each of said complementary members having a longitudinally extending portion adjacent the step of maximum diameter whereby said peripherally continuous body is provided with a longitudinally extending portion, said last mentioned body portion being non-circular and being adapted to be gripped for turning said pipe remover, means pivotally connecting said complementary members to each other at said longitudinally extending non-circular portion for movement radially of each other for expanding and contracting said peripherally continuous body whereby to engage and disengage said pipe remover from a pipe, each of said complementary members having a longitudinally extending groove provided with a plurality of tapered portions whereby said complementary members in confronting relation form therebetween a longitudinally extending channel having a plurality of tapered portions, said body channel being non-circular, one tapered portion for each of said steps, a rotatable longitudinally extending threaded shaft disposed within said channel with a portion thereof extending outside of said channel, a handle on said last mentioned shaft portion and adapted to be turned for turning said shaft, said threaded shaft having a plurality of threaded portions of successively decreasing pitch, one threaded portion for each tapered portion and the threaded portion most remote from said pivotal connection having the greatest pitch, a plurality of non-circular spreader members threadedly mounted on said threaded shaft, one spreader member disposed in each tapered portion of said channel and engaging the wall thereof, whereby when said threaded shaft is turned said spreader members move longitudinally to expand and contract said peripherally continuous body, each step in the expanded condition of said body being of sufficient diameter to tightly engage the inner surface of a pipe of corresponding diameter, the parts being so proportioned that each spreader member is in contact with the channel wall throughout the extent of the movement of said spreader member whereby to reinforce the wall of their associated steps when said pipe remover is in engagement with a pipe.

10. An expandible pipe remover for gripping the internal surface of a pipe, comprising a plurality of confronting complementary members forming a peripherally continuous body, said peripherally continuous body having a plurality of longitudinally extending steps of different lateral dimensions, each of said steps being adapted to engage a pipe of a different inner lateral dimension and being of smaller lateral dimension than said pipe when said pipe remover is inserted therein, means operatively connecting said complementary members to each other for movement away from and toward one another whereby to laterally expand and contract said peripherally continuous body for engaging and disengaging said pipe remover from a pipe, and means for imparting said movement to said members whereby to expand and contract said peripherally continuous body to grip and release, respectively, a pipe.

11. A pipe remover comprising a pair of complementary members forming a main body portion, said complementary members being shaped to provide said main body portion with a plurality of longitudinally extending steps of different lateral extent, means pivotally connecting said members to each other for lateral movement toward and away from each other to contract and expand, respectively, the lateral dimension of said main body portion, and means for moving said members toward and away from each other.

12. A pipe remover comprising a pair of complementary members forming a main body portion, said complementary members being shaped to provide said main body portion with a plurality of longitudinally extending steps of different lateral extent, a connector member, both said complementary members being pivotally connected to said connector member for radial movement away from and toward each other whereby said pipe remover can expand and contract in a lateral direction, means operatively carried by one of said complementary members for moving said members toward and away from each other.

13. A pipe remover comprising a plurality of complementary members, means movably connecting said complementary members, said movably connected complementary members forming a substantially peripherally continuous circular main body portion and a non-circular portion adapted to be gripped for turning said pipe remover, and means operatively carried by one of said complementary members for moving said plurality of members away from and toward each other to expand and contract said main body portion to grip and release, respectively, the internal wall of a pipe.

14. An expandible pipe remover for gripping the internal surface of a pipe, comprising a plurality of confronting complementary members forming a peripherally continuous body, and a non-circular part adapted to be gripped for turning said pipe remover, said peripherally continuous body having a plurality of longitudinally extending steps of different lateral dimensions, each of said steps being adapted to engage a pipe of a different inner lateral dimension and being of smaller lateral dimension than said pipe when said pipe remover is inserted therein, means operatively connecting said complementary members to each other for movement away from and toward one another whereby to laterally expand and contract said peripherally continuous body for engaging and disengaging said pipe remover from a pipe, and means operatively carried by one of said complementary members for imparting said movement to said members whereby to expand and contract said peripherally continuous body to grip and release, respectively, a pipe.

References Cited in the file of this patent

UNITED STATES PATENTS

| 314,243 | Heathcote | Mar. 24, 1885 |
| 1,377,301 | Youle | May 10, 1921 |
| 2,539,039 | Siracusa | Jan. 23, 1951 |
| 2,713,975 | Martin | July 26, 1955 |
| 2,732,249 | Siracusa | Jan. 24, 1956 |

FOREIGN PATENTS

| 443,557 | Germany | May 3, 1927 |